US009887401B2

(12) United States Patent
Aston et al.

(10) Patent No.: US 9,887,401 B2
(45) Date of Patent: Feb. 6, 2018

(54) BATTERY ASSEMBLY, BATTERY CONTAINMENT APPARATUS, AND RELATED METHODS OF MANUFACTURE

(71) Applicant: The Boeing Company, Huntington Beach, CA (US)

(72) Inventors: Richard W. Aston, Brea, CA (US); Michael William Bohman, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/832,373

(22) Filed: Aug. 21, 2015

(65) Prior Publication Data

US 2017/0054118 A1 Feb. 23, 2017

(51) Int. Cl.
*B64G 1/00* (2006.01)
*H01M 2/10* (2006.01)
(Continued)

(52) U.S. Cl.
CPC ....... *H01M 2/1077* (2013.01); *B29C 67/0088* (2013.01); *B29D 99/006* (2013.01);
(Continued)

(58) Field of Classification Search
CPC .. H01M 2/107; H01M 10/613; H01M 10/625; H01M 10/6551; H01M 2220/20;
(Continued)

(56) References Cited

U.S. PATENT DOCUMENTS 4,275,130 A * 6/1981 Rippel ................ H01M 2/14
429/144
6,207,315 B1 * 3/2001 Gelon ................ B64G 1/425
244/171.7
(Continued)

FOREIGN PATENT DOCUMENTS

CN 102593393 * 2/2012 ............ H01M 10/52
CN 102593393 A 7/2012
(Continued)

OTHER PUBLICATIONS

Translation English CN102593393.*
(Continued)

*Primary Examiner* — Assres H Woldemaryam
(74) *Attorney, Agent, or Firm* — Armstrong Teasdale LLP

(57) ABSTRACT

A battery assembly is provided. The assembly includes a battery containment apparatus including a chassis base and divider sheets coupled to the chassis base, wherein the divider sheets are spaced from each other such that a battery cell slot is defined between adjacent sheets. The apparatus further includes a compression plate assembly including first compression and second compression plates coupled to a divider sheet at opposing ends of the apparatus, and a tensioning member coupled between the first and second compression plates. A battery cell is positioned within each battery cell slot defining a plurality of battery cells, and the first and second compression plates compressively hold the battery cells between the divider sheets. At least one of the chassis base and the compression plate assembly are formed from a thermoplastic material.

18 Claims, 8 Drawing Sheets

(51) Int. Cl.

| | | |
|---|---|---|
| *B29C 67/00* | (2017.01) | |
| *B64G 1/42* | (2006.01) | |
| *G05B 19/4099* | (2006.01) | |
| *H01M 10/625* | (2014.01) | |
| *H01M 10/6551* | (2014.01) | |
| *H01M 10/613* | (2014.01) | |
| *B29D 99/00* | (2010.01) | |
| *B33Y 80/00* | (2015.01) | |
| *B33Y 10/00* | (2015.01) | |
| *B33Y 50/02* | (2015.01) | |

(52) U.S. Cl.
CPC .............. *B33Y 80/00* (2014.12); *B64G 1/425* (2013.01); *G05B 19/4099* (2013.01); *H01M 10/613* (2015.04); *H01M 10/625* (2015.04); *H01M 10/6551* (2015.04); *B33Y 10/00* (2014.12); *B33Y 50/02* (2014.12); *G05B 2219/35134* (2013.01); *G05B 2219/49007* (2013.01); *H01M 2220/20* (2013.01)

(58) Field of Classification Search
CPC .. H33Y 80/00; B29C 67/0088; B29D 99/006; B64G 1/425; G05B 19/4099; G05B 2219/35134; G05B 2219/49007; B33Y 10/00; B33Y 50/02
See application file for complete search history.

(56) References Cited

U.S. PATENT DOCUMENTS

| | | | | |
|---|---|---|---|---|
| 6,255,015 | B1* | 7/2001 | Corrigan | H01M 2/0242 429/120 |
| 7,981,538 | B2* | 7/2011 | Kim | H01M 2/1016 429/120 |
| 8,916,282 | B1* | 12/2014 | Bohman | H01M 10/625 429/120 |
| 2003/0219646 | A1* | 11/2003 | LeCostaouec | H01M 4/8605 428/292.1 |
| 2006/0012334 | A1* | 1/2006 | Watson | B60L 3/0046 320/112 |
| 2009/0029227 | A1* | 1/2009 | Patton | C01B 3/065 429/416 |
| 2011/0003187 | A1* | 1/2011 | Graaf | H01M 10/625 429/120 |
| 2013/0130086 | A1* | 5/2013 | Schaefer | H01M 2/202 429/120 |
| 2014/0302360 | A1* | 10/2014 | Klammler | H01M 2/1072 429/72 |
| 2014/0363720 | A1* | 12/2014 | Ackermann | H01M 10/5004 429/120 |
| 2015/0044544 | A1 | 2/2015 | Tuncay et al. | |

FOREIGN PATENT DOCUMENTS

| | | |
|---|---|---|
| CN | 202633407 U | 12/2012 |
| CN | 203085661 U | 7/2013 |
| EP | 2403032 A1 | 1/2012 |
| RU | 103675 U1 | 4/2011 |

OTHER PUBLICATIONS

Eurasian Patent Office Search Report for related application 201691186 dated Feb. 6, 2017; 3 pp.

EPO Extended European Search Report for related application 16176821.3 dated Dec. 22, 2016, 9 pp.

* cited by examiner

BATTERY ASSEMBLY, BATTERY CONTAINMENT APPARATUS, AND RELATED METHODS OF MANUFACTURE

BACKGROUND

The field of the present disclosure relates generally to battery systems and, more specifically, to a lightweight battery containment apparatus for housing a plurality of battery cells in spacecraft and other vehicles.

At least some known vehicles include one or more battery packs for providing power to electrical systems of the vehicles. Battery packs generally include a plurality of individual battery cells positioned within a battery containment apparatus. The battery cells are coupled together, either in series or in parallel, to provide power to the electrical systems of the vehicle. In the aerospace industry, the battery containment apparatus is designed to account for various considerations that facilitate efficient operation of the vehicle. For example, when used in at least some known spacecraft, the battery containment apparatus is designed to be lightweight, capable of thermally insulating the battery cells, and formed from material having a coefficient of thermal expansion closely matched with the battery cells. As such, components of the battery containment apparatus are typically formed from a metallic material such as aluminum. Components formed from metallic materials are generally fabricated by machining a work piece into a desired shape. However, machining a metallic work piece can be a time-consuming and laborious task, and the shape of the final product is generally limited by the machining process. Moreover, components formed from metallic material are generally good thermal conductors, which sometimes requires thermally isolating the battery cell from the associated vehicle. In addition, metallic material is generally electrically conductive, which can result in the formation of electrical shorts within the battery cell.

In one known aerospace application, such as a spacecraft utilizing all-electric propulsion, the mass efficiency of the battery cell assembly is of particular importance. Typically, ion propulsion systems are extremely efficient, but also have very low thrust capabilities. This can result in long transfer orbit duration to geosynchronous orbit, which can delay the service start date of the satellite. As such, an overall design goal for at least some known spacecraft is to reduce the mass of components loaded thereon to enable the accommodation of additional revenue generating payload without increasing transfer orbit duration.

BRIEF DESCRIPTION

In one aspect, a battery assembly is provided. The assembly includes a battery containment apparatus including a chassis base and a plurality of divider sheets coupled to the chassis base, wherein the plurality of divider sheets are spaced from each other such that a battery cell slot is defined between adjacent divider sheets. The apparatus further includes a compression plate assembly including a first compression plate and a second compression plate coupled to at least one divider sheet of the plurality at opposing ends of the battery containment apparatus, and at least one tensioning member coupled between the first and second compression plates. At least one battery cell is positioned within each battery cell slot thereby defining a plurality of battery cells, and the first and second compression plates are configured to compressively hold the plurality of battery cells between the plurality of divider sheets. At least one of the chassis base and the compression plate assembly are formed from a thermoplastic material.

In another aspect, a satellite is provided. The satellite includes a battery assembly configured to power the satellite. The battery assembly includes a battery containment apparatus including a chassis base and a plurality of divider sheets coupled to the chassis base, wherein the plurality of divider sheets are spaced from each other such that a battery cell slot is defined between adjacent divider sheets. The apparatus further includes a compression plate assembly including a first compression plate and a second compression plate coupled to at least one divider sheet of the plurality at opposing ends of the battery containment apparatus, and at least one tensioning member coupled between the first and second compression plates. At least one battery cell is positioned within each battery cell slot thereby defining a plurality of battery cells, and the first and second compression plates are configured to compressively hold the plurality of battery cells between the plurality of divider sheets. At least one of the chassis base and the compression plate assembly are formed from a thermoplastic material.

In another aspect, a method of forming a battery assembly is provided. The method includes coupling a plurality of divider sheets to a chassis base, wherein the plurality of divider sheets are spaced from each other such that a battery cell slot is defined between adjacent divider sheets. The method further includes coupling a first compression plate and a second compression plate to at least one divider sheet of the plurality at opposing ends of the battery cell assembly, coupling at least one tensioning member between the first and second compression plates, and positioning at least one battery cell within each battery cell slot thereby defining a plurality of battery cells. The first and second compression plates are configured to compressively hold the plurality of battery cells between the plurality of divider sheets. At least one of the chassis base and the first and second compression plates are formed from a thermoplastic material.

In yet another aspect, a method of forming a compression plate for use in a battery containment apparatus is provided. The method includes generating programmed instructions for forming the compression plate that includes a first face sheet, an opposing second face sheet, and at least one rib structure extending therebetween. The programmed instructions are generated based on a virtual model representing the compression plate. The method further includes executing the programmed instructions to direct additive manufacturing of the compression plate in which one or more layers of thermoplastic material are successively created until features of the compression plate correspond to the virtual model.

DETAILED DESCRIPTION

The implementations described herein relate to a battery assembly, a battery containment apparatus, and related methods of manufacture. The battery cell includes a chassis base, a plurality of divider sheets, a battery cell positioned between adjacent divider sheets, and compression plates on opposing ends of the batter containment apparatus. At least one of the chassis base and the compression plates are fabricated from a thermoplastic material, such as a polyetherketoneketone material having carbon fiber material dispersed therein. Forming components of the battery containment apparatus by the thermoplastic material facilitates reducing the mass of the battery containment apparatus, thereby increasing the mass efficiency of the battery assembly including the battery cells. The thermoplastic material has one or more characteristics that facilitate efficient operation of a vehicle implementing the battery assembly. For example, the thermoplastic material is lightweight, thermally insulative, and electrically conductive to facilitate dissipating static charge. Moreover, forming the components from thermoplastic material enables them to be manufactured via one or more additive manufacturing techniques. As such, as will be described in more detail below, one or more of the components may be formed with features that enable the battery containment apparatus to compressively hold battery cells therein in a more efficient manner.

Figure 1:
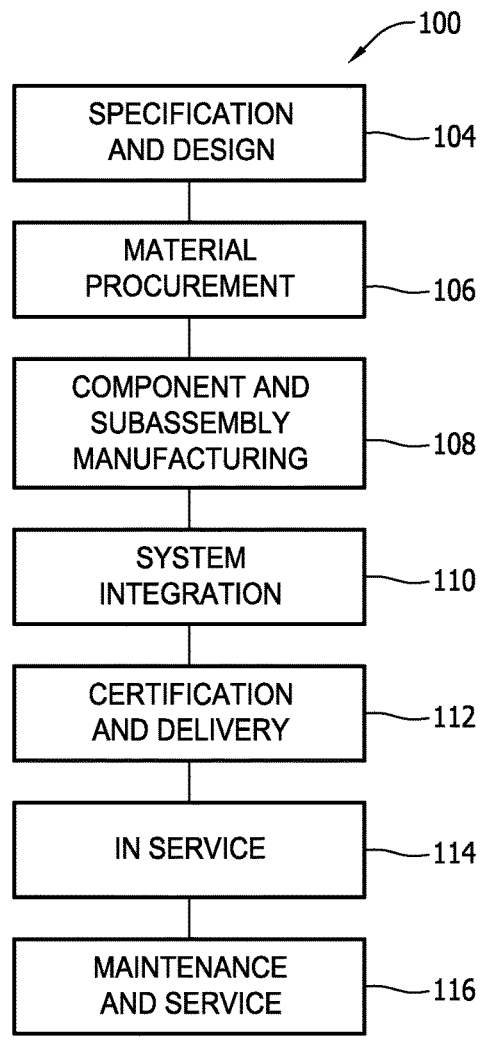
FIG. 1 is a flow diagram of an exemplary aircraft production and service method.
Figure 2:
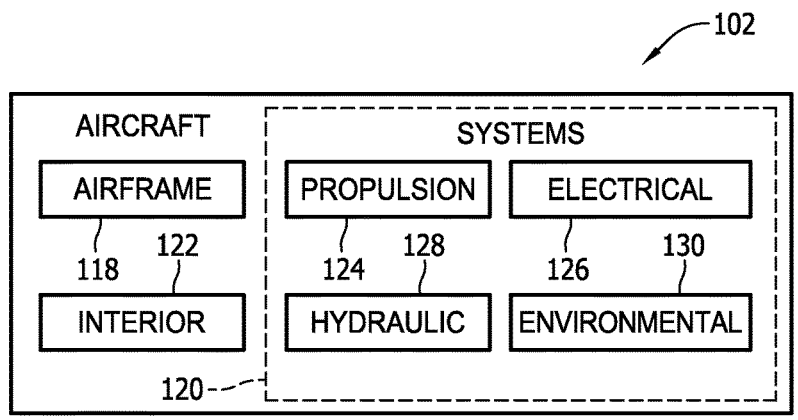
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, spacecraft, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
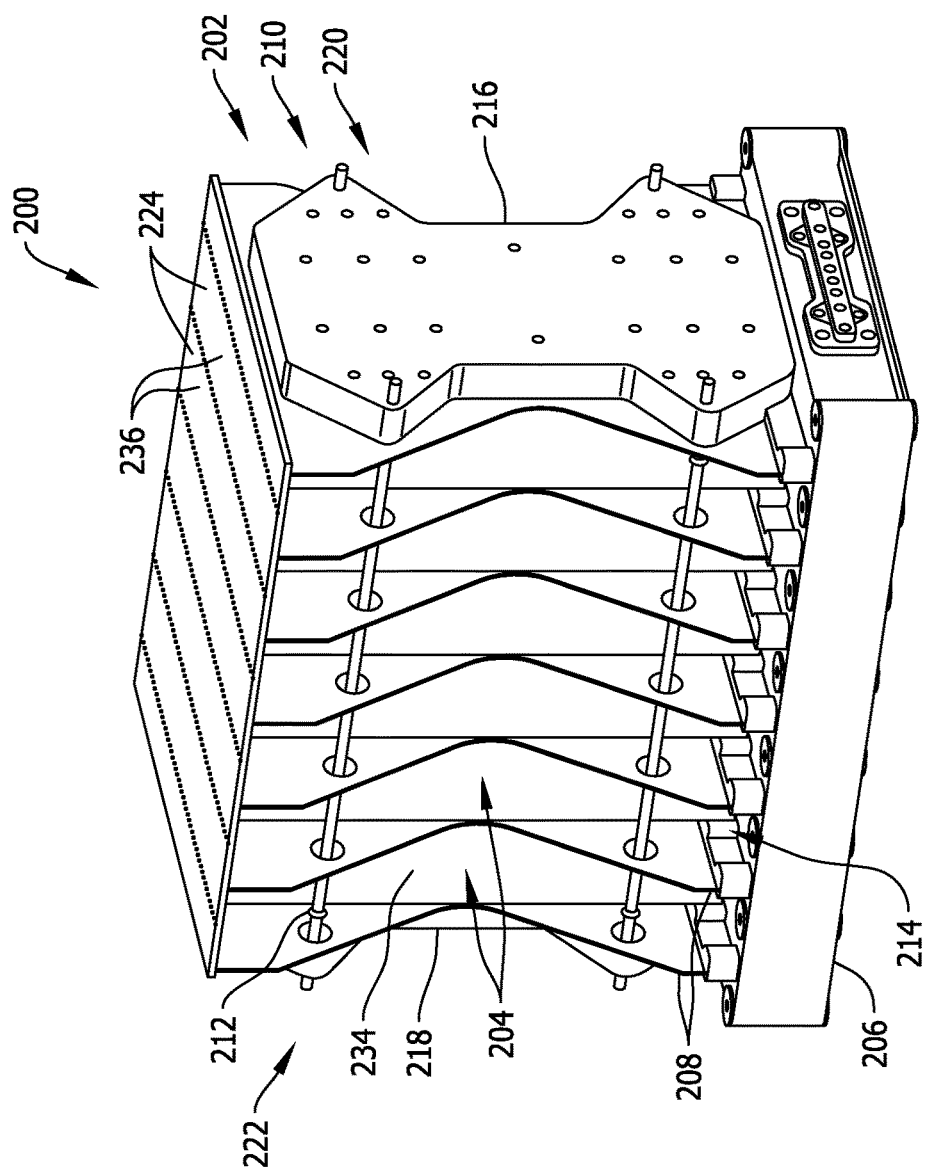
FIG. 3 is a perspective view of an exemplary battery assembly.
Figure 4:
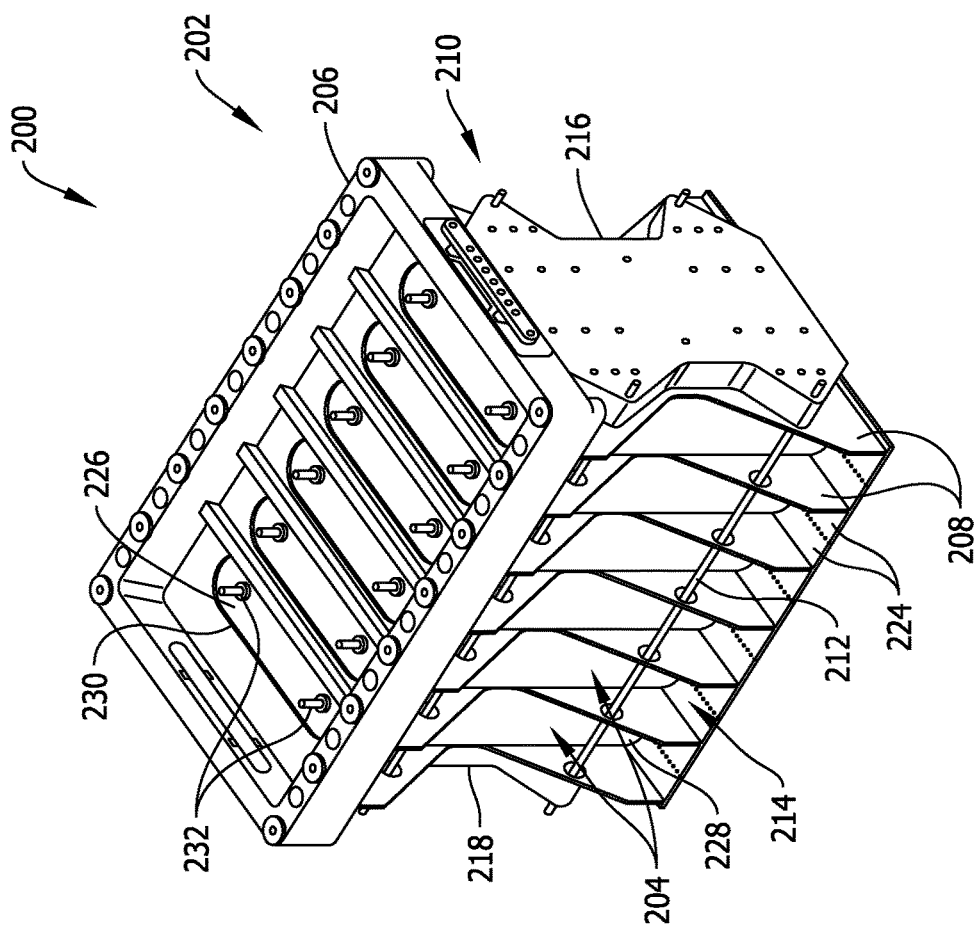
FIG. 4 is an alternative perspective view of the battery assembly shown in FIG. 3.

FIG. 3 is a perspective view of an exemplary battery assembly 200, and FIG. 4 is an alternative perspective view of battery assembly 200. In the exemplary implementation, battery assembly 200 includes a battery containment apparatus 202 and a plurality of battery cells 204 positioned within battery containment apparatus 202. Battery containment apparatus 202 includes a chassis base 206, a plurality of divider sheets 208 coupled to chassis base 206, a compression plate assembly 210, and at least one tensioning member 212. The plurality of divider sheets 208 are spaced from each other along chassis base 206 such that a battery cell slot 214 is defined between adjacent divider sheets 208. At least one battery cell 204 is positioned within each battery cell slot 214 thereby defining the plurality of battery cells 204.

Compression plate assembly 210 includes a first compression plate 216 and a second compression plate 218 coupled to at least one divider sheet 208 of the plurality at opposing ends of battery containment apparatus 202. More specifically, first compression plate 216 is coupled to a divider sheet 208 at a first end 220 of battery containment apparatus 202 and second compression plate 218 is coupled to a divider sheet 208 at an opposing second end 222 of battery containment apparatus 202. As such, as will be described in more detail below, tensioning members 212 are coupled between first and second compression plates 216 and 218 to compressively hold the plurality of battery cells 204 between the plurality of divider sheets 208.

In the exemplary implementation, battery containment apparatus 202 further includes a plurality of thermally conductive fins 224 each coupled to at least one divider sheet 208 and extending between adjacent divider sheets 208. In one implementation, thermally conductive fins 224 are integrally formed with each divider sheet 208. The plurality of thermally conductive fins 224 are positioned to radiate heat generated by the plurality of battery cells 204. More specifically, each battery cell 204 includes a first end 226 coupled to chassis base 206, and an opposing second end 228. The plurality of thermally conductive fins 224 are positioned adjacent to second ends 228 of the plurality of battery cells 204. By extending between adjacent divider sheets 208, thermally conductive fins 224 at least partially define battery slots 214 and facilitate radiating heat from within battery assembly 200 towards thermally conductive fins 224.

Referring to FIG. 4, chassis base 206 includes a plurality of battery cell openings 230 sized to receive at least one battery cell 204 therein. More specifically, first ends 226 of each battery cell 204 extend at least partially through battery cell openings 230 such that battery cell electrodes 232 are exposed on an underside of chassis base 206. As such, the plurality of battery cells 204 can be coupled together, either in series or in parallel, to provide power to electrical systems of a vehicle, such as aircraft 102.

Battery containment apparatus 202 may be fabricated from any material that enables battery assembly 200 to function as described herein. More specifically, at least one of chassis base 206 and compression plate assembly 210 are formed from a thermoplastic material such that battery assembly 200 is at least about 80 percent mass efficient and, more specifically, is at least about 85 percent mass efficient. As used herein, "mass efficient" refers to a mass of battery cells 204 as a percentage of a total mass of battery assembly 200. As such, at least one of chassis base 206 and compression plate assembly 210 are formed from a thermoplastic material such that the mass of the plurality of battery cells 204 is greater than about 80 percent of the total mass of battery assembly 200. In one implementation, battery cells 204 are LSE series lithium ion battery cells manufactured by GS Yuasa™ ("GS Yuasa" is a registered trademark of GS Yuasa Corporation of Kyoto-shi, Japan).

Moreover, at least one of chassis base 206 and compression plate assembly 210 are formed from a thermoplastic material having a coefficient of thermal expansion defined within a range between about 10.0 ($10^{-6}$ in/(in*° F.)) and about 20.0 ($10^{-6}$ in/(in*° F.)). For example, in the exemplary implementation, battery cells 204 include an outer casing 234 formed from a material having a first coefficient of thermal expansion and the thermoplastic material has a second coefficient of thermal expansion. More specifically, outer casing 234 may be at least partially formed from a metallic material such as aluminum having a coefficient of thermal expansion of about 12.3 ($10^{-6}$ in/(in*° F.)), and the thermoplastic material is selected such that a difference between the first and second coefficients of thermal expansion is within a predetermined threshold. In one implementation, the predetermined threshold is about 25 percent. Example thermoplastic material includes, but is not limited to, a polyetherketoneketone (PEKK) material, and a polyetherimide material. More specifically, the PEKK material includes carbon fiber material (not shown) dispersed therein, thereby forming a carbon fiber reinforced polymer (CFRP) material having a coefficient of thermal expansion of about 15.0 ($10^{-6}$ in/(in*° F.)). In one embodiment, the CFRP material includes carbon fiber having a weight percentage of about 15 percent within the CFRP material. As such, the CFRP material is capable of bleeding static charge generated by battery cells 204 without being highly electrically conductive to facilitate reducing the likelihood of electrical shorts, and has a coefficient of thermal expansion closely matched with that of battery cells 204. Moreover, the CFRP material is thermally insulative such that heat generated by battery cells 204 is radiated from battery containment apparatus 202 through thermally conductive fins 224. In an alternative implementation, the thermoplastic material has a coefficient of thermal expansion such that the difference in coefficients of thermal expansion is greater than the predetermined threshold, and additional components are utilized to compensate for expansion mismatches between the two materials.

Thermally conductive fins 224 may be fabricated from any material that enables battery assembly 200 to function as described herein. More specifically, thermally conductive fins 224 may be fabricated from a material having a greater thermal conductivity than the material used to fabricate battery containment apparatus 202. For example, in one implementation, thermally conductive fins 224 are fabricated from a metallic material having at least one layer 236 of a high-emittance coating material applied to an outer surface of the plurality of thermally conductive fins 224. The high-emittance coating material facilitates increasing the thermal conductivity of the metallic material used to fabricate thermally conductive fins 224.

Figure 5:
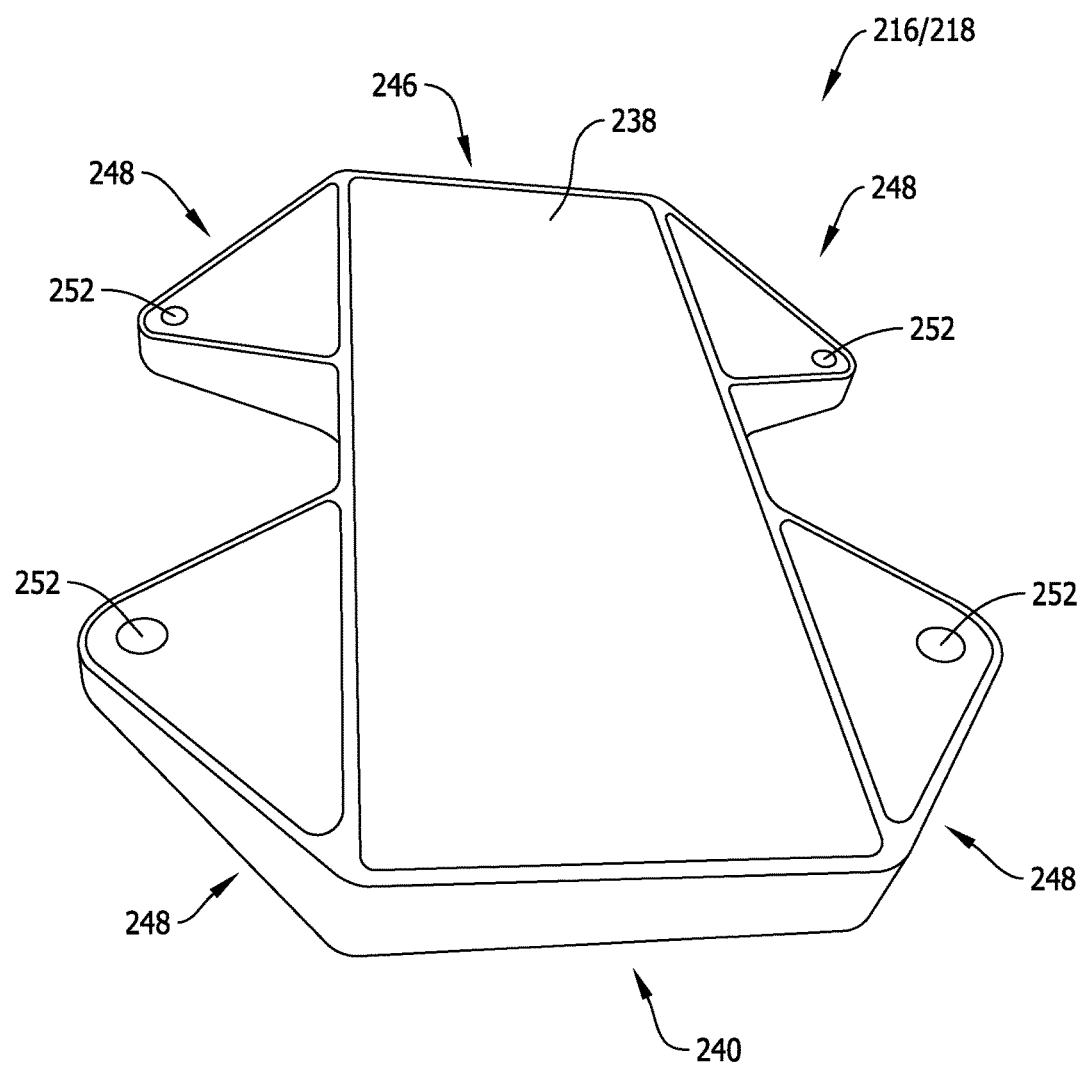
FIG. 5 is a perspective view of an exemplary compression plate that may be used with the battery assembly shown in FIG. 3.
Figure 6:
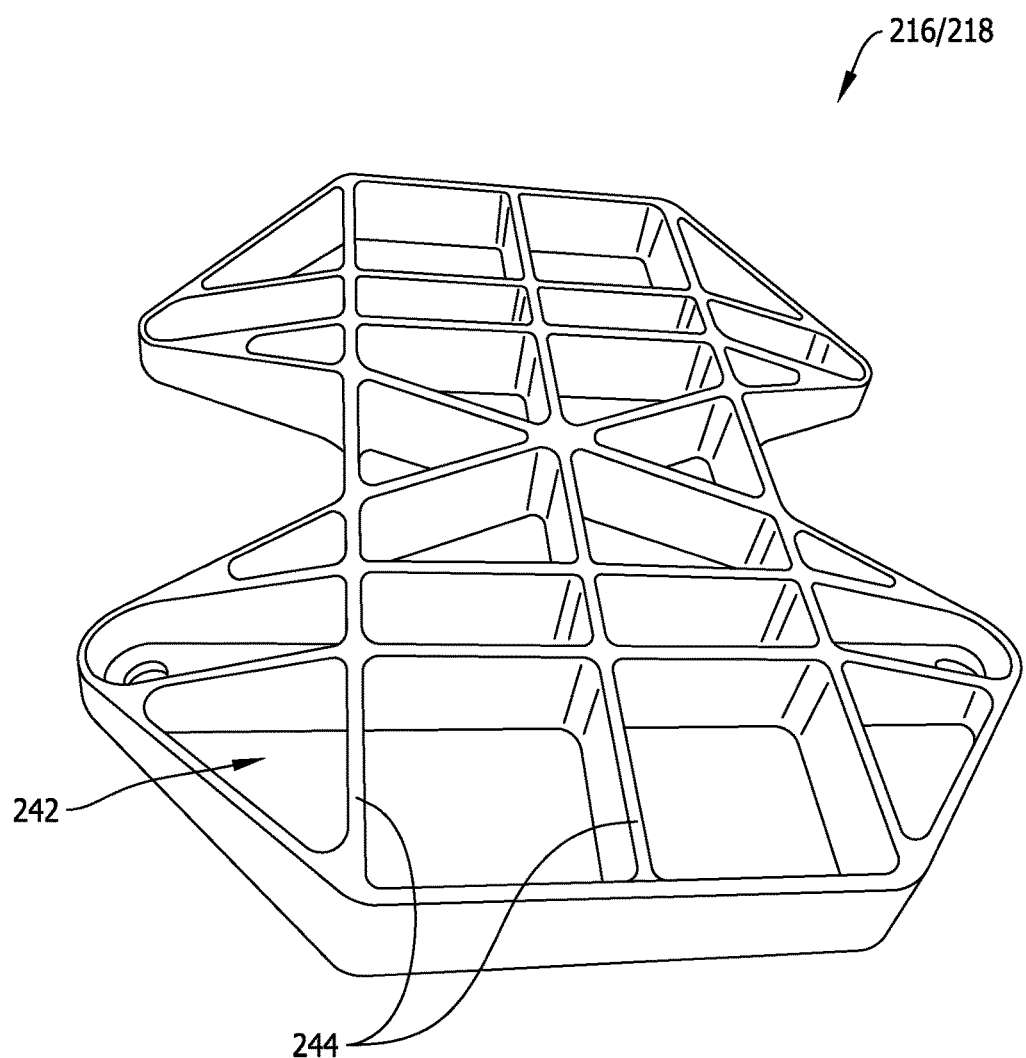
FIG. 6 is a partially transparent perspective view of the compression plate shown in FIG. 5.
Figure 7:
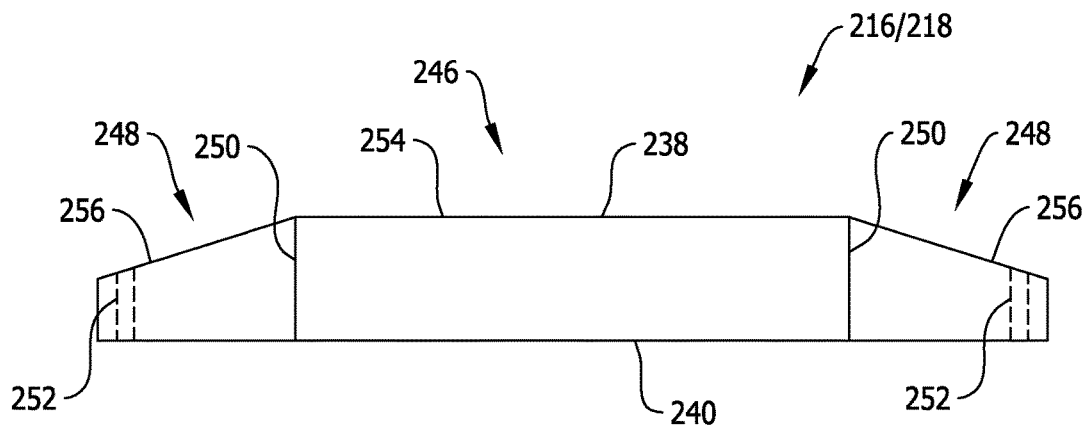
FIG. 7 is an end view of the compression plate shown in FIG. 5.

FIG. 5 is a perspective view of an exemplary compression plate 216/218 that may be used with battery assembly 200 (shown in FIG. 3), FIG. 6 is a partially transparent perspective view of compression plate 216/218, and FIG. 7 is an end view of compression plate 216/218. In the exemplary implementation, compression plate 216/218 includes a first face sheet 238 for coupling to divider sheets 208 (shown in FIG. 3), an opposing second face sheet 240, and at least one rib structure 244 extending therebetween. First and second face sheets 238 and 240 are separated from each other by a distance such that at least one convection cavity 242 is defined by first and second face sheets 238 and 240 and the at least one rib structure 244 within first and second compression plates 216 and 218. The at least one rib structure 244 provides strength and structural stiffness for compression plate 216/218, and convection cavity 242 facilitates thermally insulating battery cells 204 within battery containment apparatus 202 (each shown in FIG. 3).

First and second face sheets 238 and 240 are also separated from each other by a distance to facilitate providing micrometeroid and debris (MMOD) protection for battery assembly 200. More specifically, at least a portion of first face sheet 238 couples to at least one divider sheet 208 and second face sheet 240 is positioned a distance from the at least one divider sheet 208. As such, when impacted by a micrometeroid or debris, second face sheet 240 facilitates fragmenting the micrometeroid or debris, and first face sheet 238 is capable of blocking the fragments penetrating therethrough.

Moreover, in the exemplary implementation, compression plate 216/218 includes a central portion 246 for coupling to the at least one divider sheet 208, as will be explained in more detail below, and at least one outer portion 248 extending from a side edge 250 of central portion 246 and extending outwardly from the at least one divider sheet 208. As described above, tensioning members 212 are coupled between first and second compression plates 216 and 218 to compressively hold the plurality of battery cells 204 between the plurality of divider sheets 208. More specifically, each outer portion 248 includes an aperture 252 sized to receive at least one tensioning member 212 therethrough. As such, the at least one outer portion 248 is configured to bend towards the at least one divider sheet 208 when loaded in tension by the at least one tensioning member 212 such that central portion 246 is compressively held against the at least one divider sheet 208.

Referring to FIG. 7, first face sheet 238 includes a first portion 254 extending along central portion 246 of compression plate 216/218 and a second portion 256 extending along outer portions 248 of compression plate 216/218. As described above, outer portions 248 extend outwardly from the at least one divider sheet 208 when compression plate 216/218 is coupled thereto. More specifically, first face sheet 238 has a non-planar configuration such that second portions 256 extend at an oblique orientation relative to first portion 254. As such, when loaded in tension by the at least one tensioning member 212, central portion 246 of compression plate 216/218 provides a more uniform and centrally located pressure distribution across the plurality of battery cells 204. In an alternative implementation, first face sheet 238 has a convex outer curvature.

Figure 8:
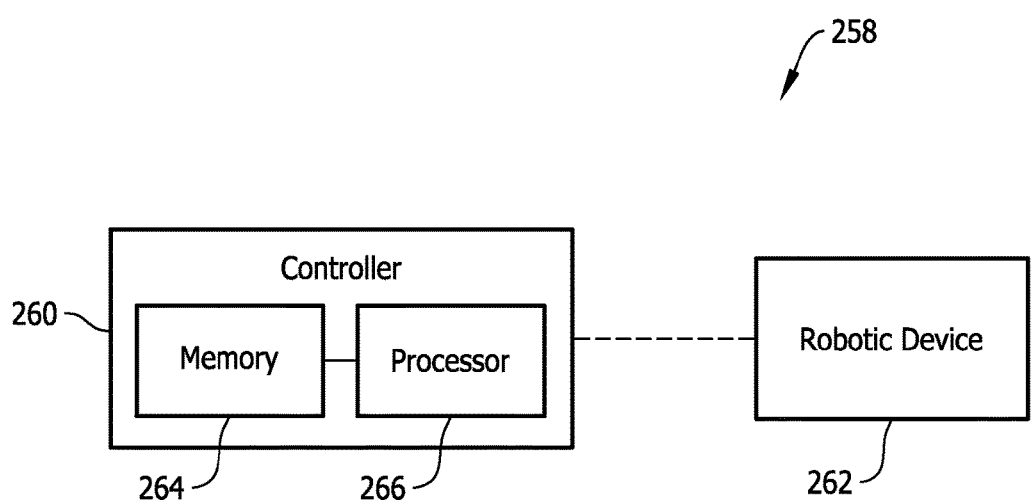
FIG. 8 is a schematic illustration of an exemplary additive manufacturing system.
Figure 9:
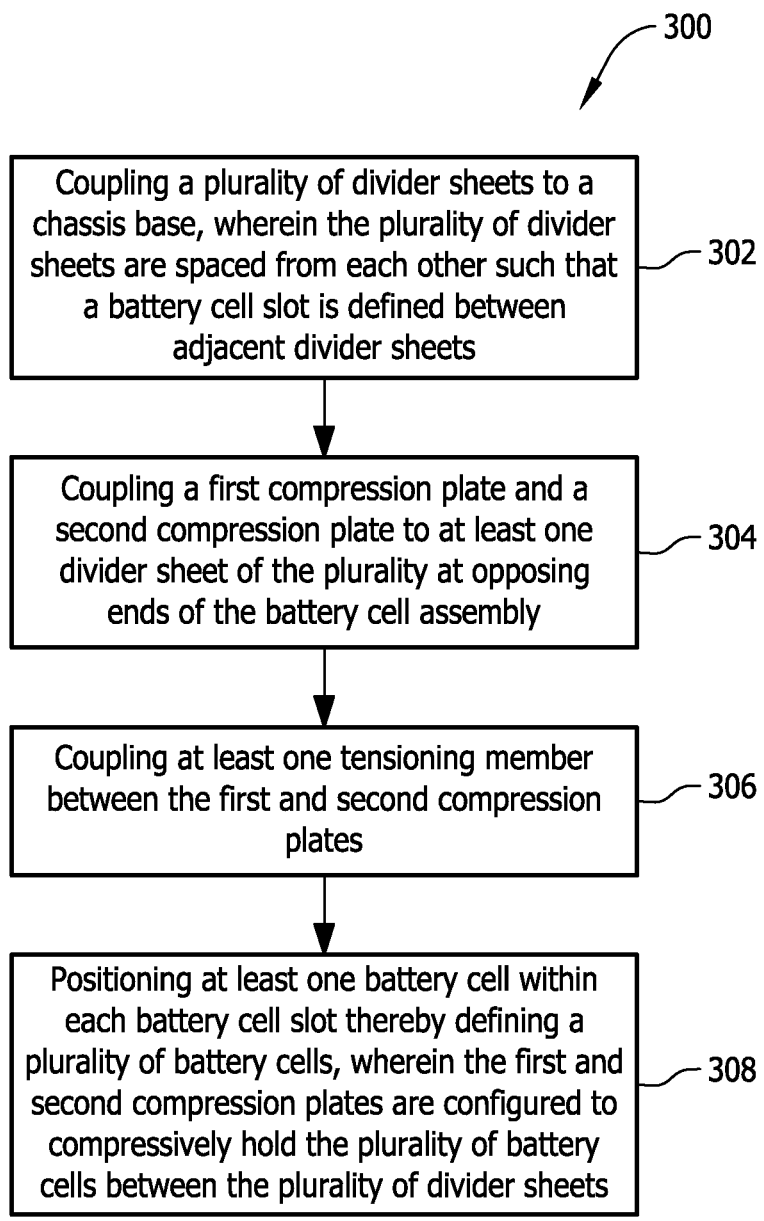
FIG. 9 is a flow diagram illustrating an exemplary method of forming a battery assembly.
Figure 10:
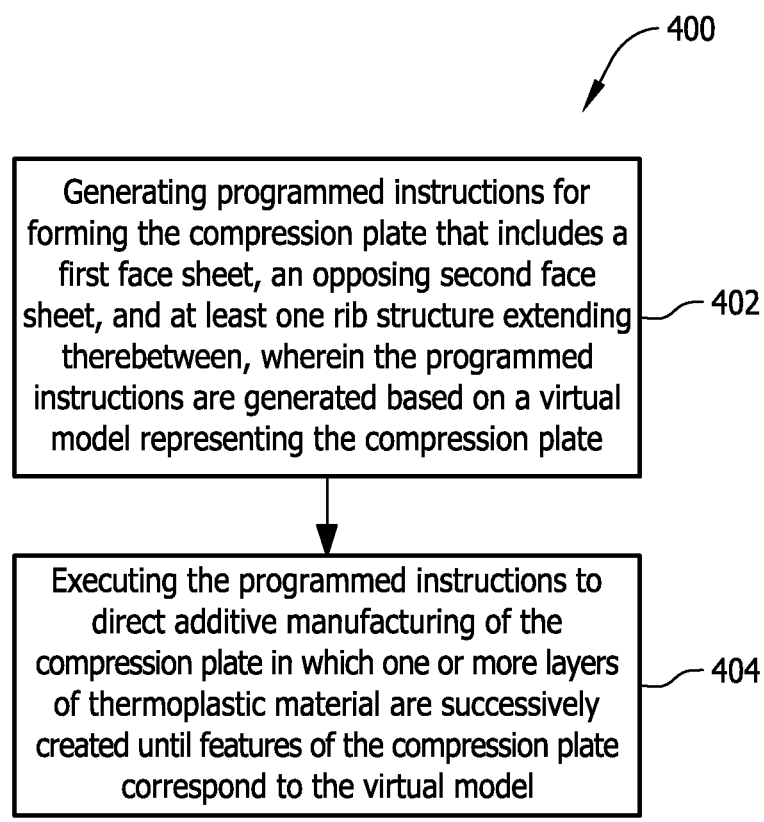
FIG. 10 is a flow diagram illustrating an exemplary method of forming a compression plate for use in a battery containment apparatus.

FIG. 8 is a schematic illustration of an exemplary additive manufacturing system 258. In the exemplary implementation, additive manufacturing system 258 includes a controller 260 coupled in communication with a robotic device 262. Robotic device 262 is any suitable computer numerically controlled device that facilitates successively creating one or more layers of thermoplastic material to form an object, such as compression plate 216/218. Controller 260 includes a memory 264 (i.e., a non-transitory computer-readable medium) and a processor 266 coupled to memory 264 for executing programmed instructions. Processor 266 may include one or more processing units (e.g., in a multi-core configuration) and/or include a cryptographic accelerator (not shown). Controller 260 is programmable to perform one or more operations described herein by programming memory 264 and/or processor 266. For example, processor 266 may be programmed by encoding an operation as executable instructions and providing the executable instructions in memory 264.

Processor 266 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 266, cause processor 266 to perform at least a portion of the functions described herein. The above examples are exemplary only, and thus are not intended to limit in any way the definition and/or meaning of the term processor.

Memory 264 is one or more devices that enable information such as executable instructions and/or other data to be stored and retrieved. Memory 264 may include one or more computer-readable media, such as, without limitation, dynamic random access memory (DRAM), synchronous dynamic random access memory (SDRAM), static random access memory (SRAM), a solid state disk, and/or a hard disk. Memory 264 may be configured to store, without limitation, executable instructions, operating systems, applications, resources, installation scripts and/or any other type of data suitable for use with the methods and systems described herein.

Instructions for operating systems and applications are located in a functional form on non-transitory memory 264 for execution by processor 266 to perform one or more of the processes described herein. These instructions in the different implementations may be embodied on different physical or tangible computer-readable media, such as memory 264 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 260 to permit access and/or execution by processor 266. In an alternative implementation, the computer-readable media is not removable.

In the exemplary implementation, at least one of chassis base 206 and compression plates 216 and 218 are fabricated using an additive manufacturing technique or 3D printing technique, such as selective laser sintering (SLS) or fusion deposition modeling (FDM). Utilizing the additive manufacturing technique eliminates complex joints and structures that would typically be defined between separate portions of a component to be formed that require welding or brazing, and increases the design flexibility of the component. More specifically, SLS is a process for generating a material from a powdered compound. In the SLS process, the powdered compound is distributed onto a work surface, and a device, such as a laser, is directed onto at least a portion of the powder, fusing those powder particles together to form a portion of a sintered material. Successive layers of the powder are distributed onto the surface, and the laser sintering process continues, fusing both the particles of the powdered material together into layers and the adjacent layers together, until the fused layers of laser sintered material are of a shape and thickness as appropriate for the intended use of the material. FDM is a process that generally includes forming plastic threads or filaments, which are fed through a heated extrusion nozzle. The nozzle at least partially melts the filaments, and the filaments are extruded onto a work surface. The thin filament of plastic cools and hardens on the surface, and successive layers of the filaments are then extruded onto the hardened plastic.

For example, in one implementation, controller 260 generates programmed instructions for forming compression plate 216/218 based on a virtual model representing compression plate 216/218. The virtual model may be either generated by controller 260, or imported from a remote source. Controller 260 then executes the programmed instructions to direct additive manufacturing of compression plate 216/218 in which one or more layers of thermoplastic material are successively created until features of compression plate 216/218 correspond to the virtual model. More specifically, the programmed instructions are transmitted to robotic device 262 for execution thereof.

A method 300 of forming battery assembly 200 is described herein. The method includes coupling 302 plurality of divider sheets 208 to chassis base 206, wherein the plurality of divider sheets 208 are spaced from each other such that battery cell slot 214 is defined between adjacent divider sheets 208. The method also includes coupling 304 first compression plate 216 and second compression plate 218 to at least one divider sheet 208 of the plurality at opposing ends of battery assembly 200, coupling 306 at least one tensioning member 212 between first and second compression plates 216 and 218, and positioning 308 at least one battery cell 204 within each battery cell slot 214 thereby defining a plurality of battery cells 204, wherein first and second compression plates 216 and 218 are configured to compressively hold the plurality of battery cells 204 between the plurality of divider sheets 208. At least one of chassis base 206 and first and second compression plates 216 and 218 are formed from a thermoplastic material such that the mass of the plurality of battery cells 204 is greater than about 80 percent of the mass of the battery assembly 200.

In one implementation, the at least one battery cell 204 includes outer casing 234 formed from a material having a first coefficient of thermal expansion. The method further includes forming at least one of chassis base 206 and the first and second compression plates 216 and 218 from the thermoplastic material having a second coefficient of thermal expansion, such that a difference between the first and second coefficients of thermal expansion is within a predetermined threshold. The method further includes forming at least one of chassis base 206, the plurality of divider sheets 208, and the first and second compression plates 216 and 218 from a polyetherketoneketone (PEKK) material. The method further includes forming at least one of chassis base 206 and the first and second compression plates 216 and 218 from the polyetherketoneketone (PEKK) material having carbon fiber material dispersed therein, thereby forming a carbon fiber reinforced polymer (CFRP) material.

The method further includes coupling thermally conductive fin 224 to at least one divider sheet 208 of the plurality, thermally conductive fin 224 extending at least partially between adjacent divider sheets 208 and configured to radiate heat generated by the plurality of battery cells 204. Thermally conductive fin 224 is formed from a metallic material having at least one layer 236 of high-emittance coating material applied thereto.

Coupling first compression plate 216 and second compression plate 218 to at least one divider sheet 208 includes coupling central portion 246 of first and second compression plates 216 and 218 to the at least one divider sheet 208, and extending at least one outer portion 248 from side edge 250 of central portion 246, the at least one outer portion 248 extending outwardly from the at least one divider sheet 208. At least one tensioning member 212 is coupled between the at least one outer portion 248 of first and second compression plates 216 and 218, wherein, when loaded in tension by the at least one tensioning member 212, central portion 246 is compressively held against the at least one divider sheet 208 such that the at least one outer portion 248 bends towards the at least one divider sheet 208.

A method 400 of forming a compression plate for use in a battery containment apparatus is also described herein. The method includes generating 402 programmed instructions for forming compression plate 216/218 that includes first face sheet 238, an opposing second face sheet 240, and at least one rib structure 244 extending therebetween, wherein the programmed instructions are generated based on a virtual model representing compression plate 216/218. The method also includes executing 404 the programmed instructions to direct additive manufacturing of compression plate 216/218 in which one or more layers of thermoplastic material are successively created until features of compression plate 216/218 correspond to the virtual model.

In one implementation, executing the programmed instructions includes forming compression plate 216/218 via at least one of a selective laser sintering (SLS) additive manufacturing technique and a fusion deposition modeling (FDM) additive manufacturing technique. The method also includes successively creating one or more layers of a polyetherketoneketone (PEKK) material having carbon fiber material dispersed therein.

Executing the programmed instructions further includes forming central portion 246 of compression plate 216/218, and forming at least one outer portion 248 extending from side edge 250 of central portion 246. The method further includes forming first portion 254 of first face sheet 238 that extends along central portion 246, and forming second portion 256 of first face sheet 238 that extends along the at least one outer portion 248, wherein second portion 256 extends in an oblique orientation relative to first portion 254. The method further includes defining an aperture in the at least one outer portion 248, aperture 252 sized to receive at least one tensioning member 212 therethrough. Executing the programmed instructions further includes forming first and second face sheets 238 and 240 a distance from each other such that at least one convection cavity 242 is defined by first and second face sheets 238 and 240 and the at least one rib structure 244 within compression plate 216/218. Executing the programmed instructions further includes forming a plurality of rib structures 244 that interconnect to at least partially define a plurality of convection cavities 242 within compression plate 216/218.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A battery assembly comprising:
   a battery containment apparatus comprising:
      a chassis base;
      a plurality of divider sheets coupled to said chassis base, wherein said plurality of divider sheets are spaced from each other such that a battery cell slot is defined between adjacent divider sheets;
      a compression plate assembly comprising a first compression plate and a second compression plate coupled to at least one divider sheet of said plurality at opposing ends of said battery containment apparatus; and
      at least one tensioning member coupled between said first and second compression plates;
   a battery cell positioned within each battery cell slot thereby defining a plurality of battery cells, wherein said first and second compression plates are configured to compressively hold said plurality of battery cells between said plurality of divider sheets; and
   a plurality of thermally conductive fins configured to radiate heat generated by said plurality of battery cells, wherein each said thermally conductive fin is coupled to at least one divider sheet and extends at least partially between adjacent said divider sheets,
      wherein at least one of said chassis base and said compression plate assembly are formed from a thermoplastic material.

2. The battery assembly in accordance with claim 1, wherein at least one of said chassis base, said plurality of divider sheets, and said compression plate assembly are formed from the thermoplastic material such that the mass of said plurality of battery cells is greater than about percent of the mass of the battery assembly.

3. The battery assembly in accordance with claim 1, wherein said battery cell comprises an outer casing formed from a material having a first coefficient of thermal expansion and the thermoplastic material has a second coefficient of thermal expansion, wherein a difference between the first and second coefficients of thermal expansion is within a predetermined threshold.

4. The battery assembly in accordance with claim 1, wherein the thermoplastic material comprises a carbon fiber reinforced polymer (CFRP) material including a polyetherketoneketone (PEKK) material having carbon fiber material dispersed therein.

5. The battery assembly in accordance with claim 1, wherein said plurality of battery cells comprise a first end coupled to said chassis base and an opposing second end, said plurality of thermally conductive fins positioned adjacent to said second end of said plurality of battery cells.

6. The battery assembly in accordance with claim 1, wherein said first and second compression plates each comprise a first face sheet coupled to said at least one divider sheet, an opposing second face sheet, and at least one rib structure extending therebetween, wherein said first and second face sheets are separated from each other by a distance such that at least one convection cavity is defined by said first and second face sheets and said at least one rib structure within said first and second compression plates.

7. The battery assembly in accordance with claim 1, wherein said first and second compression plates each comprise:
a central portion coupled to said at least one divider sheet; and
at least one outer portion extending from a side edge of said central portion and extending outwardly from said at least one divider sheet, wherein said at least one outer portion is configured to bend towards said at least one divider sheet when loaded in tension by said at least one tensioning member such that said central portion is compressively held against said at least one divider sheet.

8. A satellite comprising:
a battery assembly configured to power the satellite, said battery assembly comprising:
a battery containment apparatus comprising:
a chassis base;
a plurality of divider sheets coupled to said chassis base, wherein said plurality of divider sheets are spaced from each other such that a battery cell slot is defined between adjacent divider sheets;
a compression plate assembly comprising a first compression plate and a second compression plate coupled to at least one divider sheet of said plurality at opposing ends of said battery containment apparatus; and
at least one tensioning member coupled between said first and second compression plates;
a battery cell positioned within each battery cell slot thereby defining a plurality of battery cells, wherein said first and second compression plates are configured to compressively hold said plurality of battery cells between said plurality of divider sheets; and
a plurality of thermally conductive fins, each of said plurality of thermally conductive fins is coupled to at least one divider sheet and extending at least partially between a pair of adjacent said divider sheets, wherein at least one of said chassis base and said compression plate assembly are formed from a thermoplastic material.

9. The satellite in accordance with claim 8 wherein at least one of said chassis base and said compression plate assembly are formed from the thermoplastic material having a coefficient of thermal expansion defined within a range between about 10.0 (10-6 in/(in*° F.)) and about 20.0 (10-6 in/(in*° F.)).

10. The satellite in accordance with claim 8, wherein the thermoplastic material comprises a carbon fiber reinforced polymer (CFRP) material including a polyetherketoneketone (PEKK) material having carbon fiber material dispersed therein.

11. The satellite in accordance with claim 8, wherein said plurality of thermally conductive fins are fabricated from a metallic material having at least one layer of a high-emittance coating material applied thereto.

12. The satellite in accordance with claim 8, wherein said first and second compression plates each comprise a first face sheet coupled to said at least one divider sheet, an opposing second face sheet, and at least one rib structure extending therebetween, wherein said first and second face sheets are separated from each other by a distance such that at least one convection cavity is defined by said first and second face sheets and said at least one rib structure within said first and second compression plates.

13. The satellite in accordance with claim 8, wherein said first and second compression plates each comprise:
a central portion coupled to said at least one divider sheet; and
at least one outer portion extending from a side edge of said central portion and extending outwardly from said at least one divider sheet, wherein said at least one outer portion is configured to bend towards said at least one divider sheet when loaded in tension by said at least one tensioning member such that said central portion is compressively held against said at least one divider sheet.

14. A method of forming a battery assembly, said method comprising:
coupling a plurality of divider sheets to a chassis base, wherein the plurality of divider sheets are spaced from each other such that a battery cell slot is defined between adjacent divider sheets;
coupling a first compression plate and a second compression plate to at least one divider sheet of the plurality at opposing ends of the battery cell assembly;
coupling at least one tensioning member between the first and second compression plates;
positioning a battery cell within each battery cell slot thereby defining a plurality of battery cells, wherein the first and second compression plates are configured to compressively hold the plurality of battery cells between the plurality of divider sheets; and
coupling a thermally conductive fin to at least one divider sheet, the thermally conductive fin extending at least partially between adjacent divider sheets and configured to radiate heat generated by the plurality of battery cells,
wherein at least one of the chassis base and the first and second compression plates are formed from a thermoplastic material.

15. The method in accordance with claim 14 further comprising forming at least one of the chassis base, the plurality of divider sheets, and the first and second compression plates from the thermoplastic material such that the mass of the plurality of battery cells is greater than about 80 percent of the mass of the battery assembly.

16. The method in accordance with claim 14, wherein the battery cell includes an outer casing formed from a material having a first coefficient of thermal expansion, said method further comprising forming at least one of the chassis base and the first and second compression plates from the thermoplastic material having a second coefficient of thermal expansion, such that a difference between the first and second coefficients of thermal expansion is within a predetermined threshold.

17. The method in accordance with claim 14 further comprising forming at least one of the chassis base and the first and second compression plates from a carbon fiber reinforced polymer (CFRP) material including a polyetherketoneketone (PEKK) material having carbon fiber material dispersed therein.

18. The method in accordance with claim 14, wherein coupling a first compression plate and a second compression plate to at least one divider sheet comprises:
   coupling a central portion of the first and second compression plates to the at least one divider sheet;
   extending at least one outer portion from a side edge of the central portion, the at least one outer portion extending outwardly from the at least one divider sheet; and
   coupling the at least one tensioning member between the at least one outer portion of the first and second compression plates, wherein, when loaded in tension by the at least one tensioning member, the central portion is compressively held against the at least one divider sheet such that the at least one outer portion bends towards the at least one divider sheet.

* * * * *